United States Patent [19]

Utida et al.

[11] Patent Number: 5,082,161
[45] Date of Patent: Jan. 21, 1992

[54] METHOD OF JOINING CERAMICS AND METAL WITH TI-CO BRAZE AND NI

[75] Inventors: Sirou Utida, Hiratuka; Tosio Narita, 9-7-8, 1-jou, Sinkotoni, Kita-ku, Sapporo-shi, both of Japan

[73] Assignees: Isuzu Jidosha Kabushiki Kaisha, Tokyo; Tosio Narita, Sapporo, both of Japan

[21] Appl. No.: 611,011

[22] Filed: Nov. 9, 1990

[30] Foreign Application Priority Data

Nov. 30, 1989 [JP] Japan .................. 1-313222

[51] Int. Cl.$^5$ .............................. B23K 35/30
[52] U.S. Cl. ........................ 228/122; 228/263.12; 228/263.21
[58] Field of Search ............ 228/122, 123, 124, 903, 228/263.12, 263.16, 263.21

[56] References Cited

U.S. PATENT DOCUMENTS

| | | | |
|---|---|---|---|
| 2,857,663 | 10/1957 | Beggs | 228/263.12 |
| 3,652,237 | 3/1972 | Mizuhara | 428/660 |
| 4,352,449 | 10/1982 | Hall et al. | 228/123 |
| 4,426,033 | 1/1984 | Mizuhara | 228/122 |
| 4,562,121 | 12/1985 | Thiemann et al. | 228/122 |
| 4,725,509 | 2/1988 | Ryan | 428/660 |
| 4,726,507 | 2/1988 | Landram | 228/124 |
| 4,763,828 | 8/1988 | Fukaya et al. | 228/124 |
| 4,780,374 | 10/1988 | Mizuhara | 428/660 |
| 4,901,904 | 2/1990 | Tsuno | 228/122 |
| 4,989,773 | 2/1991 | Ishiyama | 228/122 |

FOREIGN PATENT DOCUMENTS

| | | | |
|---|---|---|---|
| 2534777 | 3/1976 | Fed. Rep. of Germany | 228/124 |
| 61-127675 | 6/1986 | Japan | 228/122 |

Primary Examiner—Richard K. Seidel
Assistant Examiner—Jeanne M. Elpel
Attorney, Agent, or Firm—Kanesaka and Takeuchi

[57] ABSTRACT

A material for joining ceramics and metal plate comprises a titanium-copper type braze disposed adjacent to the ceramics, and a stress cushioning and brazing material. The material includes first and second nickel plates, and a tungsten plate between the first and second nickel plates. The first and second nickel plates and the tungsten plate operate as a stress cushioning material, while a titanium film, copper foil and the first nickel plate form the titanium-copper type braze. In the method, the ceramics, metal plate, stress cushioning and brazing material and braze are heated above a predetermined period of time under vacuum condition. In the present invention, the ceramics and the metal plate are joined with improved thermal resistance at a joint portion.

11 Claims, 2 Drawing Sheets

```
┌─────────────────┐
│  1 : CERAMICS   │
└─────────────────┘
─────────────────── ∿ 7 : TI FILM
─────────────────── ∿ 6 : Cu FOIL
═══════════════════ ∿ 5 : NI PLATE
═══════════════════ ∿ 3 : W PLATE
═══════════════════ ∿ 4 : NI PLATE

┌─────────────────┐
│  2 : STAINLESS  │
│      STEEL PLATE│
└─────────────────┘
```

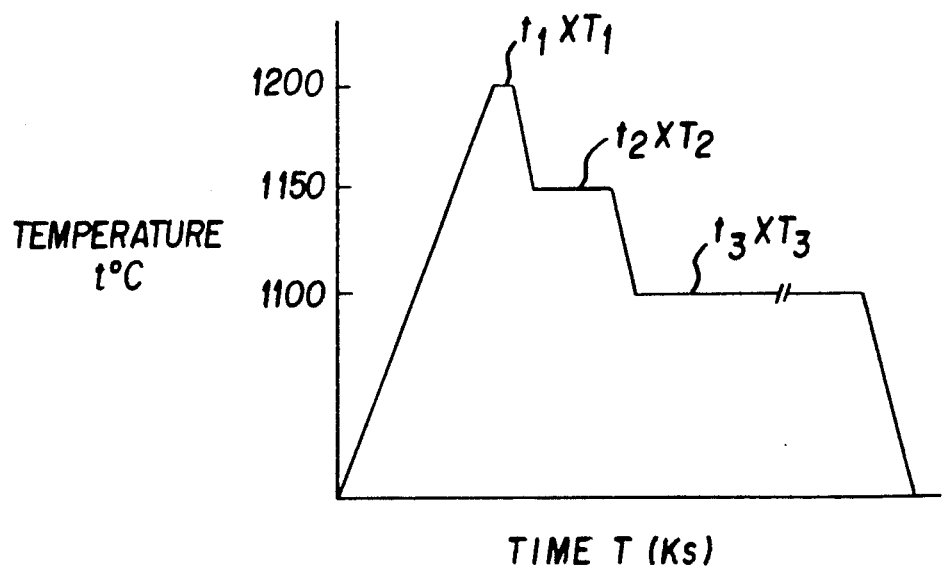

METHOD OF JOINING CERAMICS AND METAL WITH TI-CO BRAZE AND NI

BACKGROUND OF THE INVENTION

The present invention relates to a material of joining ceramics and metal, and method of joining the same.

An active metal method has been used as one of methods for joining metals and shaped powder material, such as ceramics.

In this method, materials liable to react with ceramics, that is titanium (Ti) or zirconium (Zr) liable to react with oxygen and the like, are employed as a braze. The braze used in the active metal method is formed of an alloy based on titanium or zirconium. Especially, a Ti-Cu-Ag type alloy has been employed.

In the active metal method, the braze is placed between a metal and a ceramic material, to which high temperature and high pressure are applied. Thereafter, the material is cooled, so that a metal and ceramic material are joined together.

According to Japanese Laid-open Patent Application No. Sho 59-232693, a clad type i.e. Ti-Cu-Ag alloy, was proposed for joining ceramics with metals. In case metal and ceramics are joined by active metal method using Ti-Cu-Ag alloy, it shows excellent in adherence or joining ability. However, the strength at a joint reduces rapidly above 300° C. because the braze contains silver having low melting point. Consequently, in case a ceramic product as stated above is used in a condition of high temperature, the above causes problems. Further, in the active metal method, high pressure must be applied in joining metal and ceramic.

An object of the invention is to provide a material of joining ceramics and metals, and a method thereof, which can solve the problems mentioned above and can join ceramics and metals without high pressure and can improve the thermal resistance at a joint.

SUMMARY OF THE INVENTION

In accordance with the invention, a material for joining ceramics and metals comprises a nickel plate and a titanium copper type braze. The titanium-copper braze is placed adjacent to the ceramics, and the nickel plate is located outside the titanium-copper braze. Preferably, the thickness the nickel plate is about 1.5 mm.

After the titanium-copper braze and the nickel plate is placed between the ceramics and metal as stated above, these materials are heated for a desired period of time under vacuum condition.

By heating them under vacuum condition, titanium-copper-nickel acts as a braze, copper being diffused into the braze to reduce its concentration, so that the thermal resistance at a joint can be improved. The nickel plate operates as a braze as well as a stress cushioning or buffer material.

Experimental results show that the strength at the joint can be improved and it can be kept stable up to 600° C. by selecting the thickness of the nickel plate, which is about 1.5 mm.

BRIEF DESCRIPTION OF THE DRAWINGS

FIG. 1 is an explanatory side view of the invention for showing materials disposed between ceramics and a stainless steel plate;

FIG. 2 is a time table for showing a relation between temperature and time when joining the ceramics and the metal plate;

DETAILED DESCRIPTION OF PREFERRED EMBODIMENT

Figure 3:
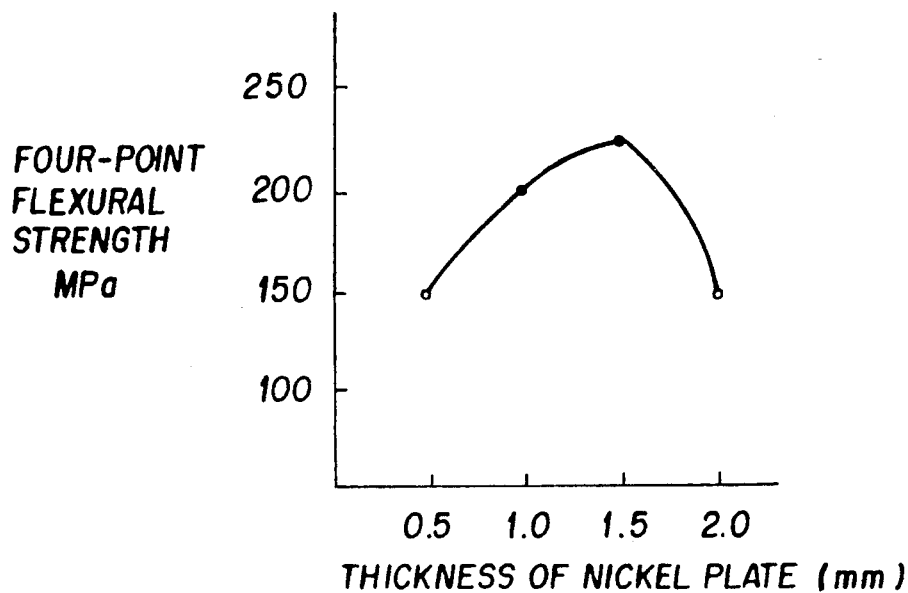
FIG. 3 is a table for showing a relation between flexural strength and thickness of a metal plate.

In FIG. 1, one example of the present invention is shown, wherein silicon nitride ceramics 1 and a stainless steel plate 2 (SUS 304) as metal are utilized. Joining materials are interposed between the ceramics 1 and the plate 2.

The joining materials comprise nickel (Ni) plates 4, 5, a tungsten (W) plate 3, a copper (Cu) foil 6, and a titanium (Ti) film 7. In particular, the tungsten plate 3 with a thickness of 1.0 mm, is interposed between the nickel plate 4 with a thickness of 1.0 mm and the nickel plate 5 with a thickness of 1.5 mm. The copper foil 6 with a thickness of 20 microns and the titanium film 7 with a thickness of 1.5 micron are situated between the ceramics 1 and the nickel plate 5 so that the titanium film 7 contacts the ceramics 1.

The joining materials are piled up and heated under a vacuum of $5 \times 10^{-5}$ Torr. In FIG. 2, the heating condition is shown, wherein the abscissa is time T(second), and the ordinate is temperature (0° C.). These materials are heated to 1,200° C. ($t_1$) at a temperature increase rate of 0.34 ° C./sec (t), which is kept for 0.06 Ks (kilo second) (T1), and cooled to 1,150° C. ($t_2$), which is kept for 0.6 Ks ($T_2$), and again cooled to 1,100° C. ($t_3$), which is kept for 3.6 Ks ($T_3$).

The ceramics 1 and the stainless steel plate 2 under this heating condition show four-point flexural strength of 200 MPa (Mega Pascal) and thermal resistance of 600 ° C.

In the present invention, a Ni-W-Ni layer, i.e. the tungsten plate 3 interposed between the nickel plates 4 and 5, absorbs or relaxes thermal stress to operate as a stress relaxing layer, and the nickel plate 5, the copper foil 6 and the titanium film 7 act as a Ni-Cu-Ti type braze.

In the joining method above, the temperature $t_3$ (1,100° C.) for time $T_3$ (3.6 Ks) was maintained in order to improve, thermal resistance by accelerating diffusion of copper in the and reducing copper concentration.

In the present invention, the thickness of the nickel plate 5 between the copper foil 6 and the tungsten plate 3 is important, because the joining strength changes to a great extent by changing the thickness of the nickel plate 5. The relationship between the thickness of the nickel plate 5 and the joining strength is shown in FIG. 3, wherein the abscissa is the thickness of the nickel plate (mm), and the ordinate is the point flexural strength.

As shown in FIG. 3, in case the thickness of the nickel plate is in the range of 1.0 mm to 1.7 mm, four-point flexural strength is above 200 MPa. Preferably, the thickness of the nickel plate 5 is 1.5 mm.

Figure 4:
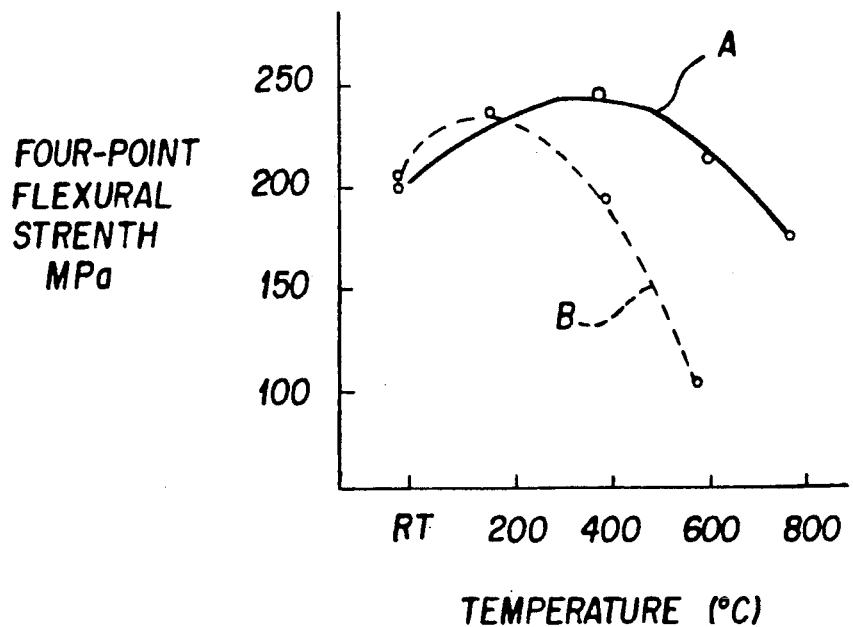
FIG. 4 is a table for showing a relation between flexural strength and temperature.

According to the present invention, the thermal, resistance at a joint can be improved by using the Ni-Cu-Ti braze, which uses nickel and does not use silver. FIG. 4 shows the relationship between the joining strength and temperature in case of using a usual Ag-Cu-Ti braze and the Ni-Cu-Ti type braze according to the invention.

The braze according to the invention, as shown by a solid line A in FIG. 4, can maintain the four-point flexural strength of 200 MPa from room temperature to 600° C., but in case of using the conventional braze, i.e. Ag-Cu-Ti braze, as shown by a broken dashed line B in FIG. 4, the four-point flexural strength reduces to below 200 MPa at 400 ° C., and reduces rapidly along increasing temperature.

The invention can improve operation efficiency and is applicable to ceramic products having complicated shape because high pressure is unnecessary when joining.

In the example as stated above, a stainless steel plate was used as metal, but the invention can naturally be applied to joining between ceramics and metals other than the stainless steel plate.

While the invention has been explained with reference to the specific embodiment of the invention, explanation is illustrative and the invention is limited only by the appended claims.

What is claimed is:

1. A material for joining ceramics and a metal plate comprising,
   a titanium-copper braze disposed adjacent to the ceramics, and
   a stress cushioning and brazing material disposed between the titanium-copper braze and the metal plate, said stress cushioning and brazing material being formed of a first nickel plate and operating as a part of the braze for the adjacent titanium-copper braze as well as a stress cushioning material.

2. A material according to claim 1, further comprising a second nickel plate situated adjacent to the metal plate, and a tungsten plate interposed between the first and second nickel plates so that the first and second nickel plates and the tungsten plate operate as a stress cushioning material.

3. A material according to claim 2, wherein said titanium-copper type braze comprises a titanium film disposed adjacent to the ceramics, and a copper foil disposed between the titanium film and the first nickel plate so that the titanium film, copper foil and the first nickel plate operate as a braze.

4. A material according to claim 1, wherein thickness of the first nickel plate is between 1.00 and 1.70 mm.

5. A material according to claim 4, wherein the thickness of the first nickel plate is 1.50 mm.

6. A method for joining ceramics and a metal, comprising,
   placing a stress cushioning and brazing material formed of a nickel plate between the ceramics and the metal,
   providing a titanium-copper braze disposed adjacent to the ceramics and to the stress cushioning material, and
   heating the ceramics, metal, stress cushioning and brazing material and titanium-copper braze for a predetermined period of time under vacuum condition to integrally connect the same, a part of the nickel plate forming the stress cushioning and brazing material located adjacent to the titanium-copper braze reacting with the titanium-copper braze for connecting to the ceramic.

7. A method according to, claim 6, wherein said ceramics, metal, stress cushioning and brazing material and braze are heated above 1,100 ° C., and then temperature is lowered to 1,100° C. and is kept for a predetermined time to diffuse copper in the braze to thereby improve thermal resistance.

8. A method according to claim 7, wherein the nickel plate is formed of a first nickel plate and a second nickel plate, situated adjacent to the metal plate, said stress cushioning and brazing material further comprises a tungsten plate interposed between the first and second nickel plates, said first and second nickel plates and tungsten plate operating as a stress cushioning material.

9. A method according to claim 8, wherein said titanium-copper braze comprises a titanium film disposed adjacent to the ceramics, and a copper foil disposed between the titanium film and the first nickel plate so that the titanium film, copper foil and the first nickel plate operate as a braze.

10. A method according to claim 9, wherein thickness of the first nickel plate is in a range of 1.0 m to 1.7 mm.

11. A method according to claim 10, wherein the thickness of the first nickel plate is about 1.5 mm.

* * * * *